United States Patent
Hipwell et al.

(10) Patent No.: US 6,483,668 B2
(45) Date of Patent: *Nov. 19, 2002

(54) EDGE CONTACT PROTECTION FEATURE FOR A DISC DRIVE HEAD

(75) Inventors: Mary C. Hipwell, Minneapolis; Andreas A. Polycarpou, Eden Prairie; Zine-Eddine Boutaghou, Vadnais Heights, all of MN (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,499

(22) Filed: Dec. 13, 1999

(65) Prior Publication Data

US 2001/0030835 A1 Oct. 18, 2001

Related U.S. Application Data

(60) Provisional application No. 60/116,757, filed on Jan. 22, 1999.

(51) Int. Cl.[7] .................................................. G11B 5/60
(52) U.S. Cl. ................. 360/235.9; 360/235.6; 360/235.7
(58) Field of Search .................... 360/234.3, 235.1, 360/235.2, 235.4, 235.9, 235.6, 235.7, 236.3, 236.4, 236.5, 237

(56) References Cited

U.S. PATENT DOCUMENTS

| | | |
|---|---|---|
| 3,872,507 A | 3/1975 | Sano et al. |
| 3,919,717 A | 11/1975 | Cullen et al. |
| 3,961,372 A | 6/1976 | Brock et al. |
| 4,673,966 A | 6/1987 | White ........................ 360/103 |
| 4,998,174 A * | 3/1991 | Wad et al. ................ 360/234.3 |
| 5,159,508 A | 10/1992 | Grill et al. |
| 5,285,337 A | 2/1994 | Best et al. |
| 5,287,235 A | 2/1994 | Cunningham et al. ...... 360/103 |
| 5,336,550 A | 8/1994 | Ganapathi et al. |
| 5,408,373 A | 4/1995 | Bajorek et al. |
| 5,499,149 A | 3/1996 | Dovek |
| 5,550,691 A | 8/1996 | Hamilton |
| 5,644,449 A | 7/1997 | Hayakawa et al. |
| 5,654,850 A | 8/1997 | Ganapathi et al. |
| 5,734,519 A | 3/1998 | Fontana, Jr. et al. ..... 360/97.01 |
| 5,761,003 A | 6/1998 | Sato |
| 5,768,055 A * | 6/1998 | Tian et al. ................ 360/235.2 |
| 5,774,303 A | 6/1998 | Teng et al. |
| 5,796,551 A * | 8/1998 | Samuelson ............... 360/236.8 |
| 5,841,608 A * | 11/1998 | Kasamatsu et al. ...... 360/236.6 |
| 5,864,452 A * | 1/1999 | Hirano et al. ............. 360/235.1 |
| 5,886,856 A * | 3/1999 | Tokuyama et al. ....... 360/234.7 |
| 5,910,864 A | 6/1999 | Hira et al. |
| 6,040,959 A * | 3/2000 | Kobayashi et al. ...... 360/236.7 |
| 6,069,769 A * | 5/2000 | Dorius et al. ............ 360/235.6 |

FOREIGN PATENT DOCUMENTS

| | | |
|---|---|---|
| JP | 62-9574 | 5/1985 |
| JP | 01158608 | 6/1989 |
| JP | 01-258218 | 1/1990 |
| WO | WO 9602914 A1 | 1/1996 |

OTHER PUBLICATIONS

IBM Technical Disclosure Bulletin, Bumper for Gliding Heads, vol. 4, Issue 4, p. 3, Sep. 1961.*

* cited by examiner

*Primary Examiner*—David L. Ometz
(74) *Attorney, Agent, or Firm*—Westman, Champlin & Kelly, P.A.

(57) ABSTRACT

A slider for supporting transducer elements in a disc drive. The slider including an edge protection feature for contact interface protection for head disc interface.

25 Claims, 9 Drawing Sheets

EDGE CONTACT PROTECTION FEATURE FOR A DISC DRIVE HEAD

CROSS-REFERENCE TO RELATED APPLICATION

The present invention claims priority to Provisional Application Ser. No. 60/116,757, filed Jan. 22, 1999, entitled "CONTACT PROTECTION FEATURE FOR SHOCK AND LOAD/UNLOAD."

FIELD OF THE INVENTION

The present invention relates to data storage systems. More specifically, the present invention relates to an edge contact protection feature for sliders of a data storage system.

BACKGROUND OF THE INVENTION

Disc drives are used to store digitally encoded information. Sliders support transducer elements for reading and/or writing data to the disc surface. Sliders include an air bearing to fly above the disc surface via rotation of discs in a disc drive for operation of the transducer elements. In a magnetic-type disc drive, it is known that improved magnetic interaction between the disc surface and transducer elements can be achieved by reducing the spacing between the slider and the disc surface. With closer flying distance between the slider and the disc surface, there is an increased propensity for contact between the slider and disc surface. Contact between the slider and disc surface can damage the disc surface and can lead to data loss.

The slider is susceptible to contact or impact with the disc surface during load and unload operations. In particular, in a dynamic ramp load system, corner edges of the slider are susceptible to contact with the disc surface. For contact start and stop ("CSS") drive, sliders are parked on a landing zone of the disc surface prior to operation. Non-operational shock introduced during shipping or handling can cause the slider to slam into the disc surface or during "spin up" or "spin down" dynamic interaction can result in significant head-disc contact.

Sliders can include rough or sharp edges due to the fabrication process. When a slider contacts or slams into a disc surface, the rough or sharp edges can damage the disc surface. One technique used to reduce damage introduced by contact between the slider and disc surface is to "blend" the edges of the slider body. Although "blending" reduces damage caused by interface between the edges of the slider body and disc surface, contact between the disc surface and edges of the air bearing can also damage the disc surface. "Blending" the edges of the air bearing is more complex since the air bearing surface geometry is more complex. Also, the fly height and performance of the air bearing are very sensitive to changes in air bearing surface geometry so manufacturing variations in the "blending" process must be controlled to limit influence to the fly height and performance of the air bearing. The present invention addresses these and other problems and offers advantages over the prior art.

SUMMARY OF THE INVENTION

The present invention relates to a slider for supporting transducer elements in a disc drive. The slider includes an edge protection feature for contact interface protection for head disc interface.

DETAILED DESCRIPTION OF THE PREFERRED EMBODIMENTS

Figure 1:
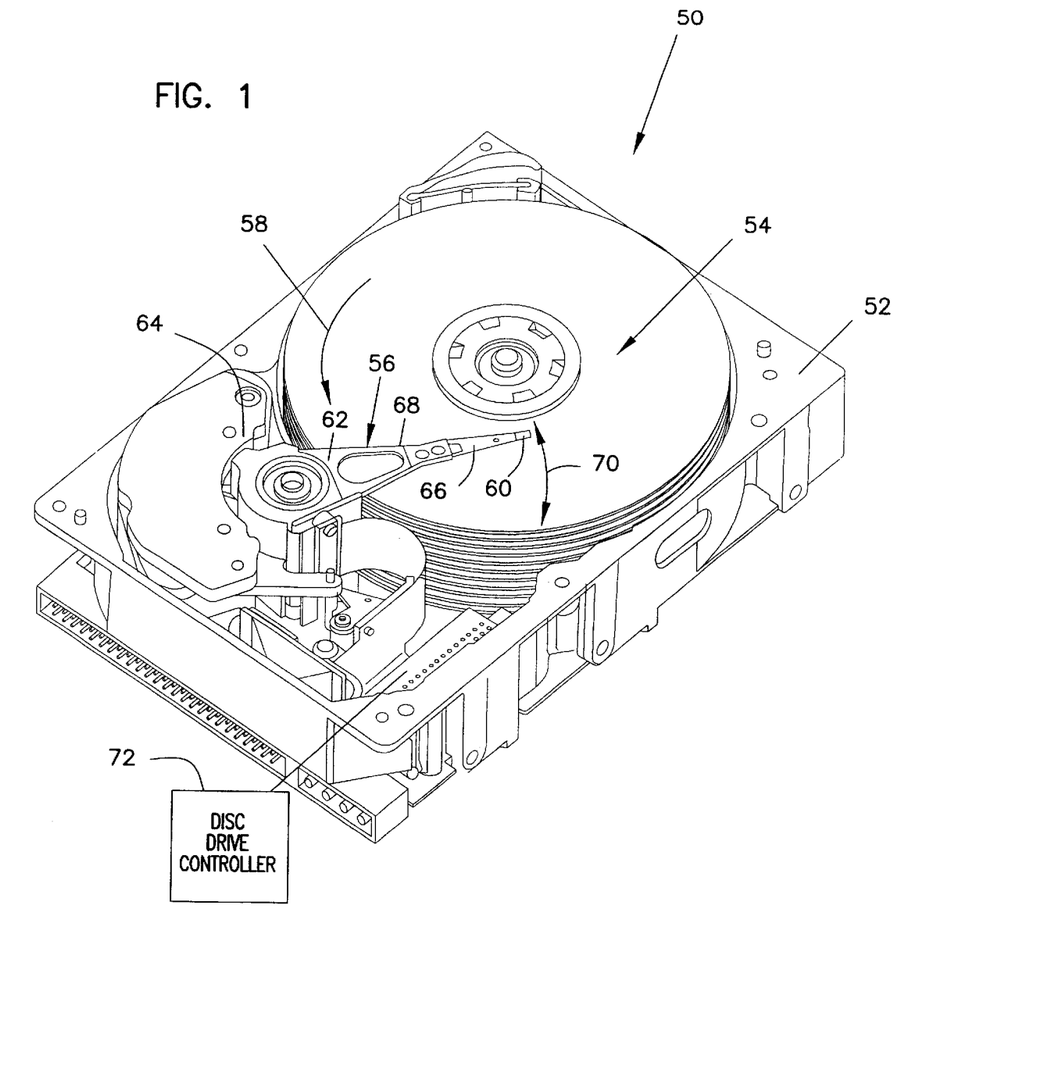
FIG. 1 is a perspective view of a disc drive.

FIG. 1. illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 for reading and/or writing data to and from discs 54. The actuator assembly includes E-block 62, voice coil motor (VCM) 64 and a suspension assembly 66. As shown, E-block 62 is rotationally coupled to chassis 52. The E-block 62 includes a plurality of actuator arms 68 (only one shown in FIG. 1). Suspension assemblies 66 are coupled to the actuator arms 68 to support heads 60 relative to the disc surface. The actuator block rotates as illustrated by arrow 70 to move heads 60 along an arcuate path (in the particular embodiment shown) for placement relative to data tracks of a disc 54 to read or write data relative to the disc surface. Movement of the E-block 62 is controlled by voice coil motor 64, which is coupled to drive circuitry of the disc drive illustrated by block 72. Operation of the spindle motor (not shown) is also coupled to drive circuitry.

Figure 2:
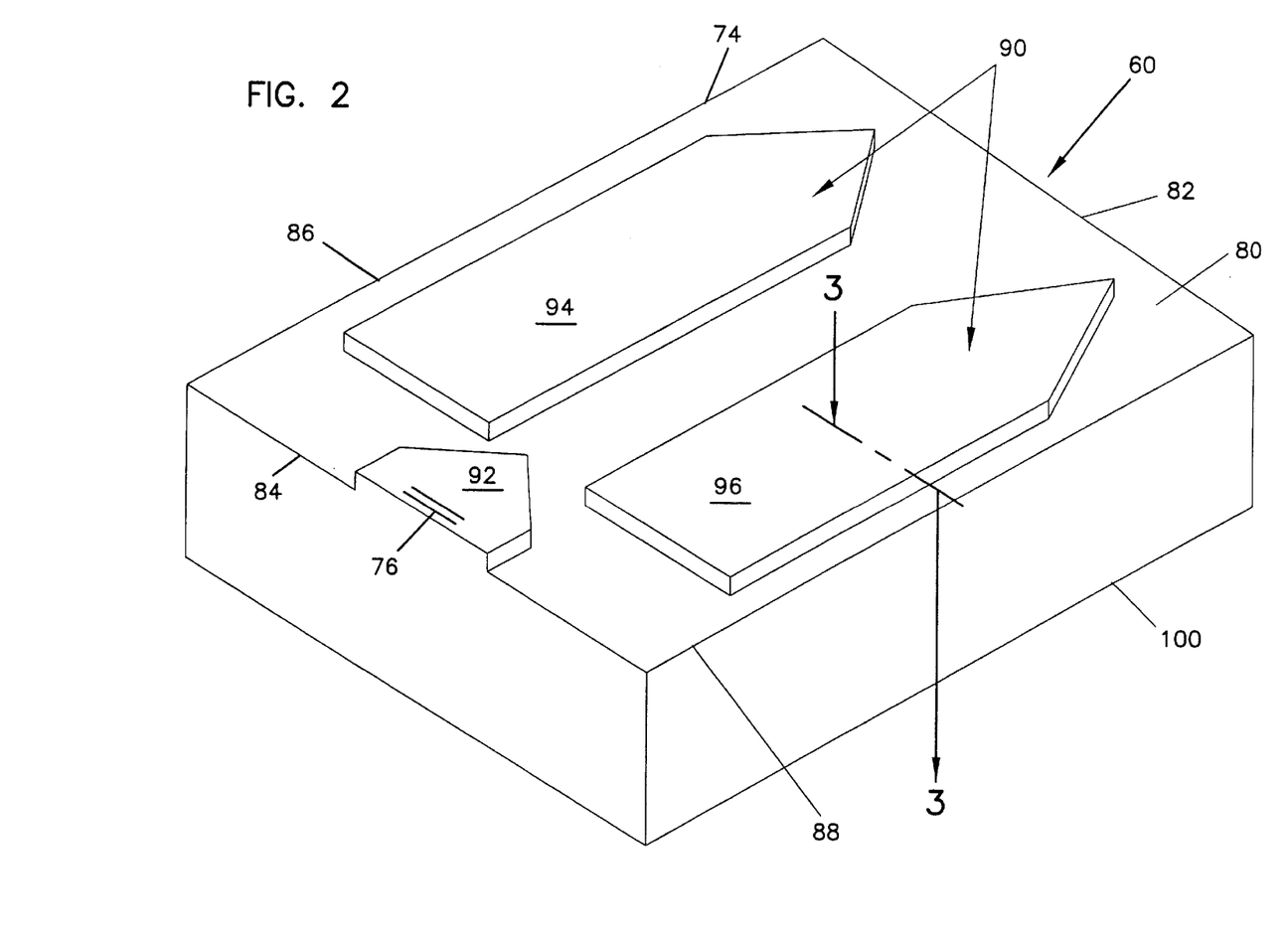
FIG. 2 is a perspective view of an embodiment of a slider including an air bearing.

FIG. 2 illustrates head 60 which includes a slider 74 supporting transducer elements 76 (illustrated schematically) for read and write operations. Transducers may be inductive type transducers, magnetoresistive or magneto-optical transducers. As shown in FIG. 2, slider 74 includes a slider body 80 having a leading edge 82, a trailing edge 84 and opposed side edges 86, 88. An air bearing 90 extends from and is elevated above slider body 80 to support the slider above the disc surface for read and write operations. In the embodiment shown, air bearing 90 include a center rail 92 supporting transducers 76 and raised side rails 94, 96. An upper surface 100 of the slider 74 is connected to suspension assembly 66 to support the slider for read and write operations.

Figure 3:
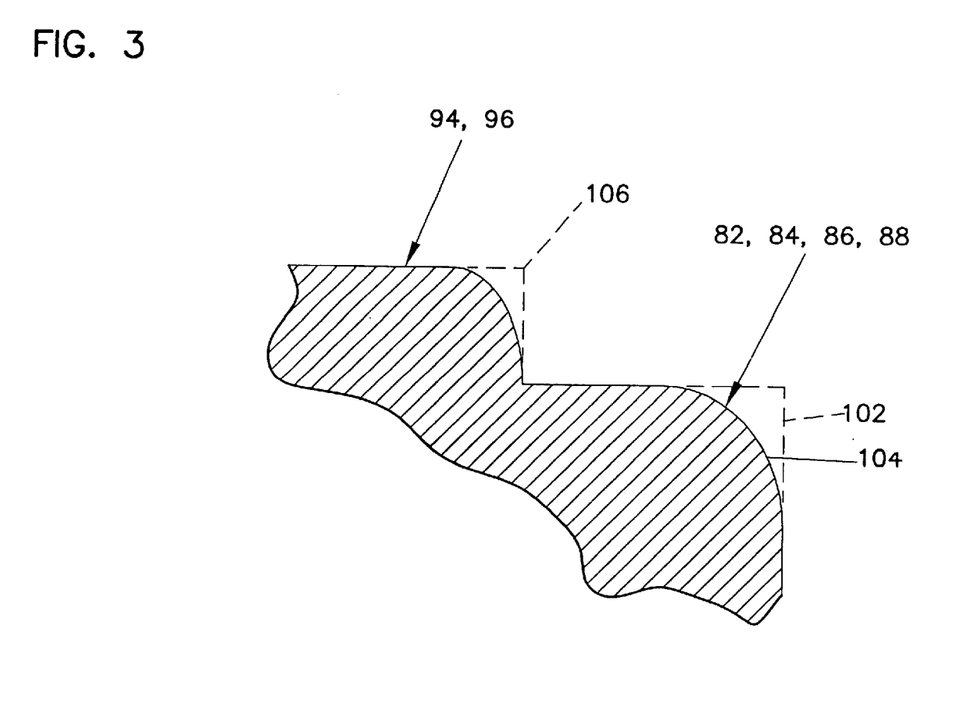
FIG. 3 is a cross-sectional view of a portion of the slider taken along line 3—3 of FIG. 2.

During operation, the slider 74 can contact or slam into the disc surface due to vibration or shock. The slider 74 can contact asperities in the disc surface causing head-disc contact. The slider can also contact the disc surface during CSS and load and unload operations. Non-operational shocks introduced during shipping or handling can also cause a slider parked on the disc surface to contact the disc surface. Multiple sliders are fabricated on a wafer (not shown) and are cut from the wafer for assembly in a disc drive. Cut edges and corners of sliders 74 are sharp as illustrated in phantom 102 in FIG. 3 and can include rough edges or burrs. Contact between the sharp edges of the slider 74 and a disc 54 can damage the disc surface. To limit damage due to head—disc contact, edges 82, 84, 86, 88 of the slider can be rounded or blended 104 as illustrated in FIG. 3.

The air bearing 90 is formed on the slider body 80 by material removal or deposition processes including ion milling, chemical etching, photolithography or other processes. The fabrication process for the air bearing can produce sharp edges 106 Head-disc contact with sharp bearing edges 106 can damage the disc media surface. Rounding of the edges of the slider body 80 does not protect contact between the bearing edges and disc surface. Rounding of the bearing edges 94, 96 increases manufacturing complexity of the air bearing since air bearing surface geometry is complex. Detailed precision is required for rounding bearing edges 94, 96 since fly height and performance of the air bearing are very sensitive to variations in the rounding process.

Figure 4:
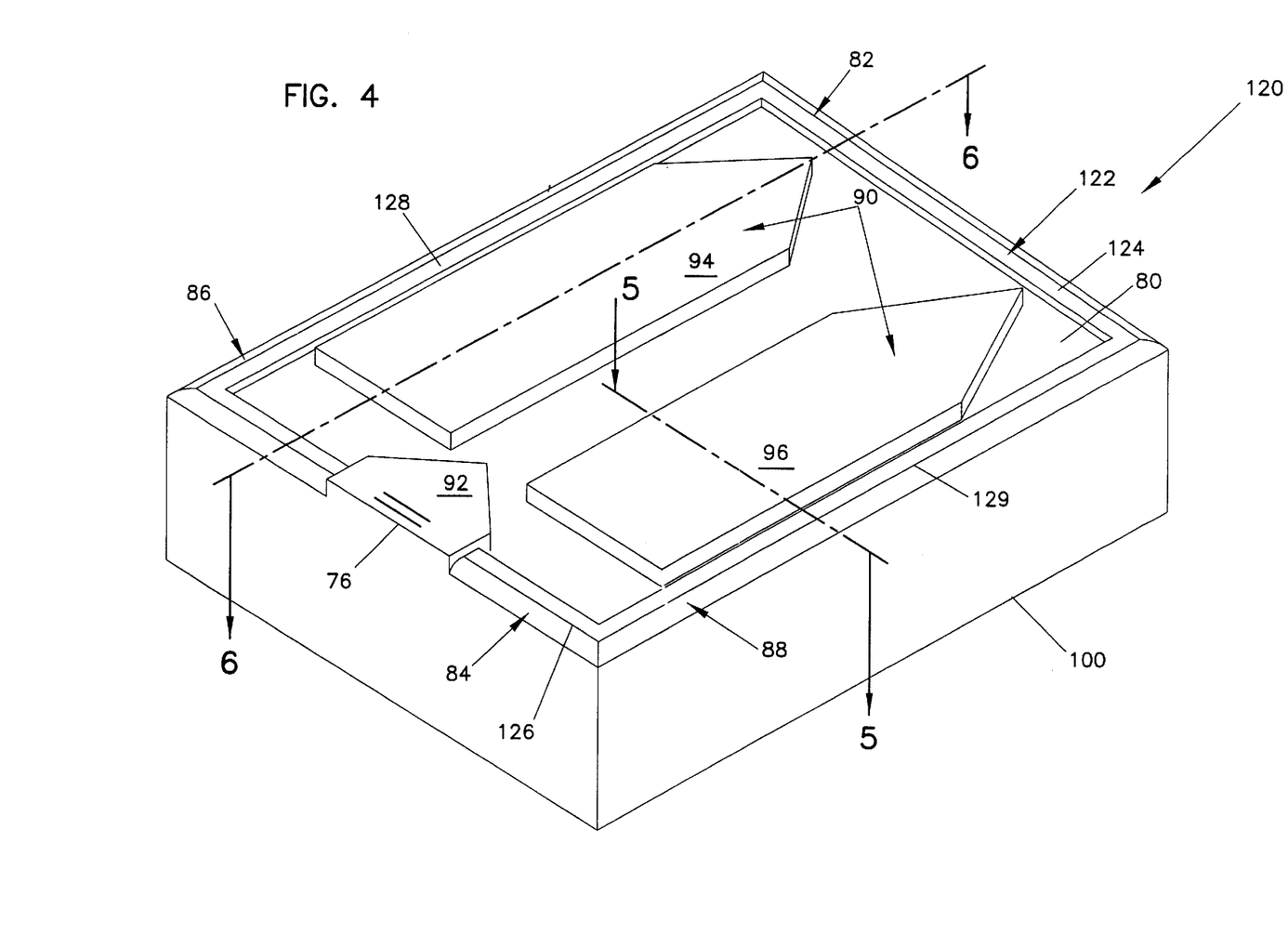
FIG. 4 is an embodiment of a slider according to the present invention including edge protection features.
Figure 5:
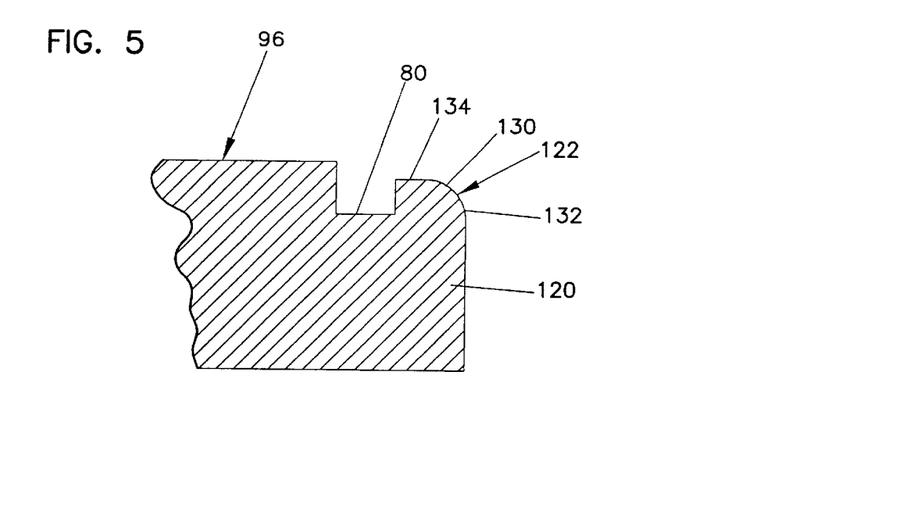
FIG. 5 is a cross-sectional view taken along line 5—5 of FIG. 4.
Figure 6:
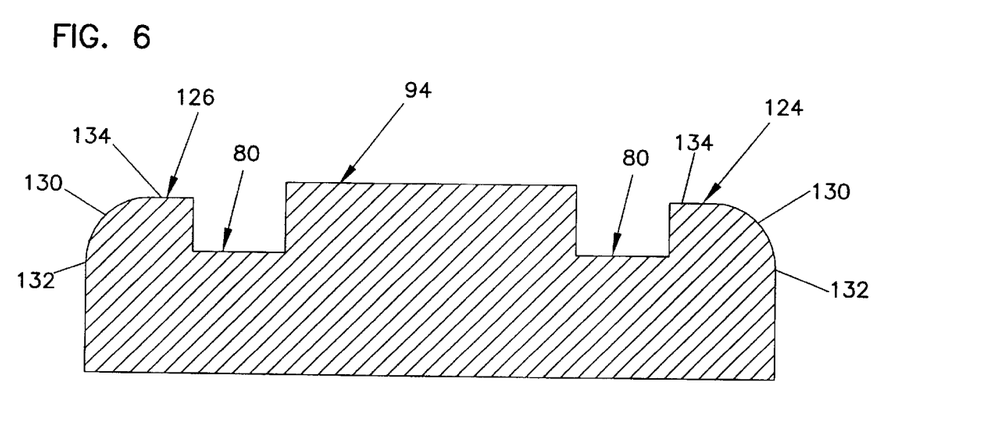
FIG. 6 is a cross-sectional view taken along line 6—6 of FIG. 4.

FIG. 4 is a perspective view of a slider 120 incorporating an embodiment of an edge protection feature of the present invention for reducing head—disc interface damage. Like numbers of slider 74 are used to identify like parts of slider 120. As shown in FIG. 4, slider 120 includes an elevated rim cap 122 extending about a perimeter of the slider body 80. As illustrated in FIGS. 5-6, rim cap 122 extends above the slider body 80 to an elevation slightly recessed from the air bearing surfaces 94, 96. In the embodiment shown, rim cap 122 includes leading, trailing and side edge portions 124, 126, 128, 129. As shown in FIGS. 5–6, rim cap 122 includes a rounded interface surface 130 which, as shown in FIG. 5, is blended between a base 132 of the rim cap 122 at the slider body 80, and an upper surface 134 of rim cap 122. The rounded interface surface 130 provides a lower contact stress for slider disc contact.

The leading, trailing and side edge portions 124, 126, 128, 129 of rim cap 122 provide a leading, trailing and side edge contact interface. The elevation of rim cap 122 is slightly below air bearing surfaces 94, 96, to provide a contact interface for air bearing edges without significant interference with the performance and operation of the air bearing 90. Although in the embodiment illustrated, portion 124, 126, 128, 129 are formed of a continuous member, the invention is not limited to specific embodiments shown. For example, perimeter rim cap 122 can include multiple—non continuous—spaced portions along perimeter edges of the slider body 80.

Rim cap 122 can be fabricated via a material removal process or mask during fabrication of the air bearing, or subsequent to formation of the air bearing 90 via known material deposition processes. Rounded interface surface 130 can be fabricated by mechanical blending and grinding processes, chemical etching or ion milling or other known process. Thus, during a shock or contact event, the rim cap 122 extend along edges of the slider body 80 to distribute contact stress during head disc contact to protect the media surface from damage. Because the rim cap 122 is recessed from the air bearing 90, rim cap 122 does not significantly influence the air bearing and fly height performance of the head 60 nor increase stiction between the slider and disc surface.

Figure 7:
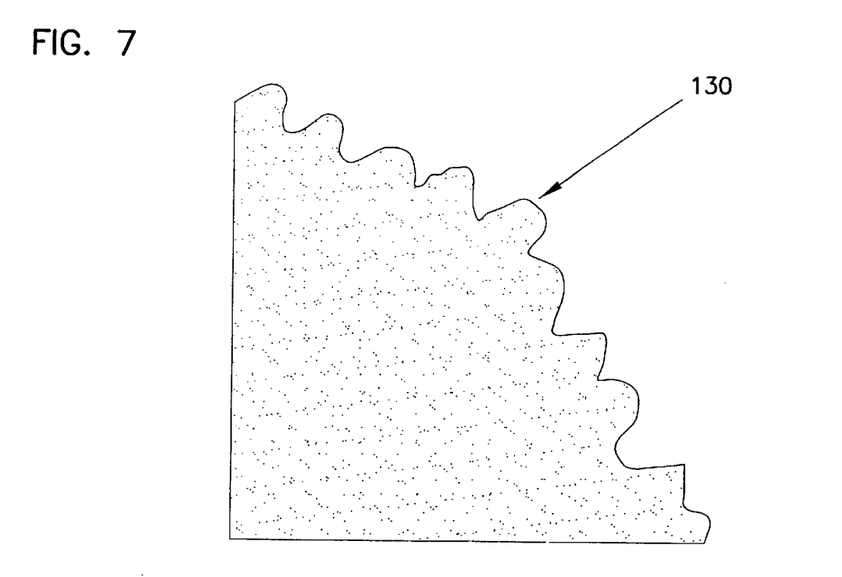
FIG. 7 is a detailed illustration of a rounded edge surface structure.
Figure 8:
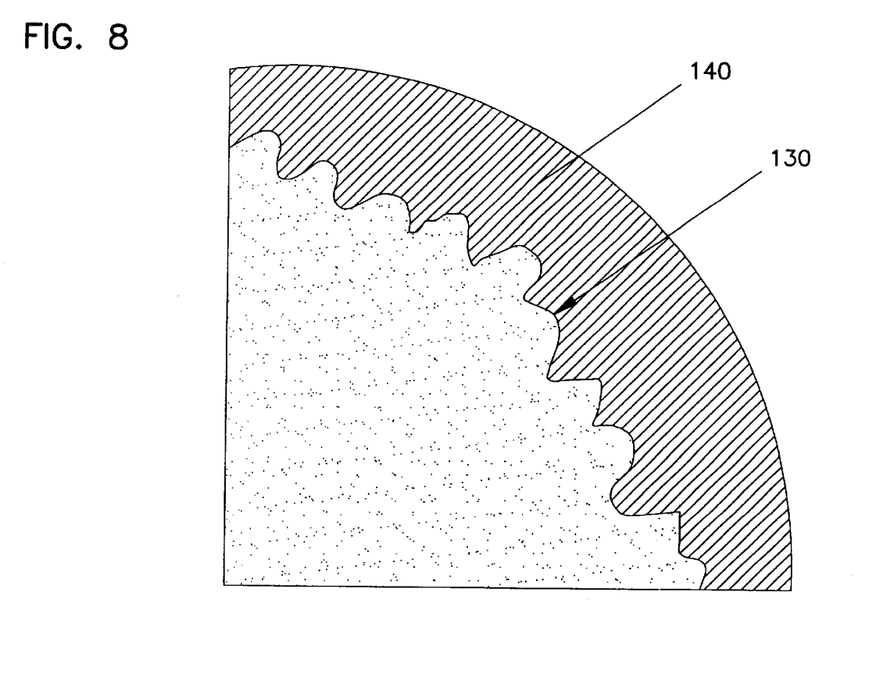
FIG. 8 is a detailed illustration of a rounded edge surface structure having a relatively smooth outer layer.

Processes for fabricating rounded interface surface 130 can provide a roughened surface structure as illustrated in FIG. 7. The roughened surface structure can scratch or damage a disc media surface. As shown in FIG. 8, a smooth outer layer 140 can be applied to rounded interface surface 130 to cover the rough surface structure and provide a smooth contact interface surface. Layer 140 can be a diamond like carbon or alternatively, layer 140 can be a relatively soft layer such as alumina $Al_2O_3$ or plastic for increased impact energy absorption.

Figure 9:
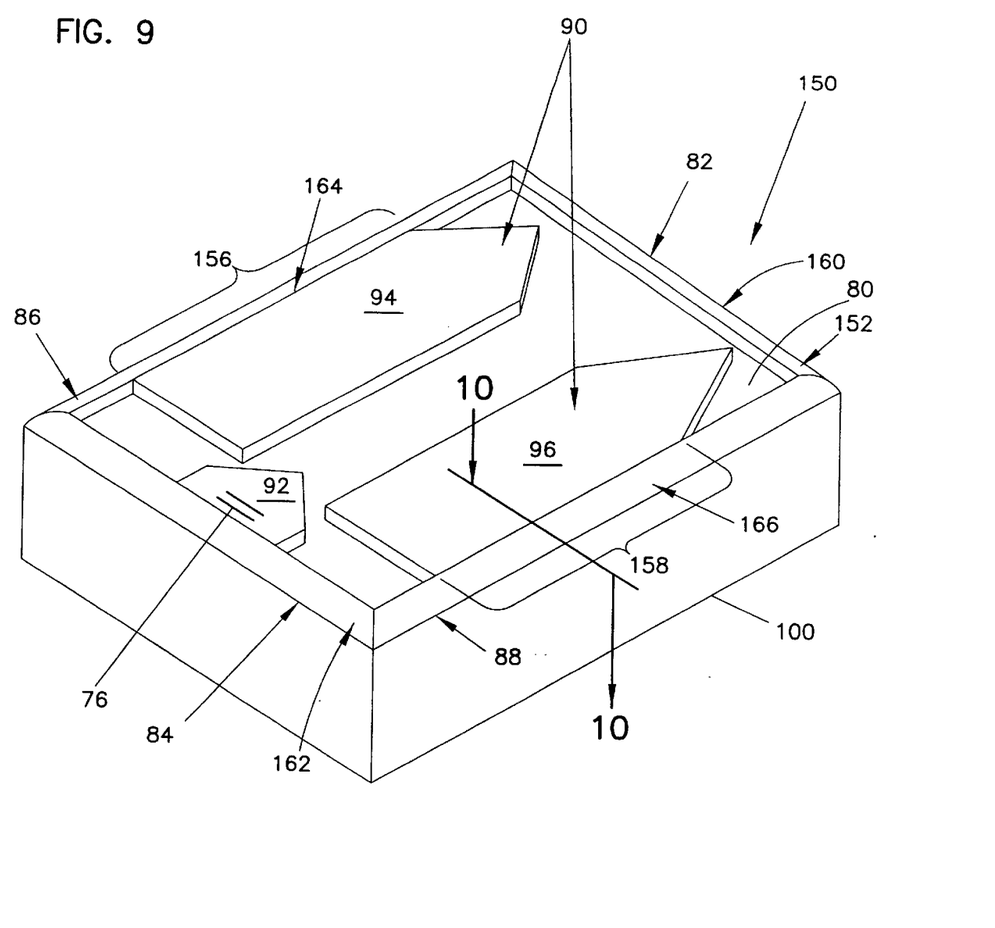
FIG. 9 is an alternate embodiment of a slider incorporating edge protection features of the present invention.
Figure 10:
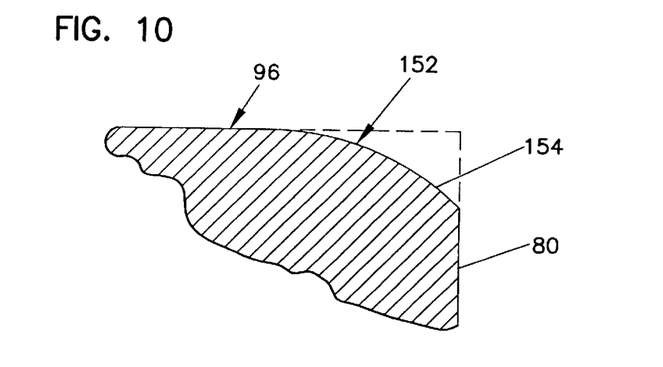
FIG. 10 is a cross-sectional view taken along line 10 of FIG. 9.

FIGS. 9–10 illustrate another embodiment of an edge protection feature for contact interface for a slider having an air bearing edges (i.e. rails 94, 96) extending to side edges 86, 88 of the slider body 80. Like numbers of the previously illustrated sliders will be used to identify like parts of slider 150 illustrated in FIGS. 9–10. As shown, slider body 80 includes an air bearing having side rails 94, 96. In the embodiment shown, rails 94, 96 extend to the perimeter edges 86, 88 of the slider body 80. Slider 150 includes a perimeter rim cap 152 about the perimeter of the slider body 80. Rim cap 152 includes a rounded interface surface 154 as previously explained with respect to rim cap 122. Portions 156, 158 of rim cap 152 are formed integral with bearing edges of rails 94, 96 as shown in FIG. 10.

In the embodiment shown, rim cap 152 includes leading, trailing and side edge portions 160, 162, 164, 166. Rim cap 152 can be formed by known masking, etching and deposition processes. Rounded interface surface 154 can be formed by known rounding or blending processes as previously explained. Thus, as described, rim cap 152 provides a contact interface for edges of the slider body and the air bearing for protecting the disc surface.

Figure 11:
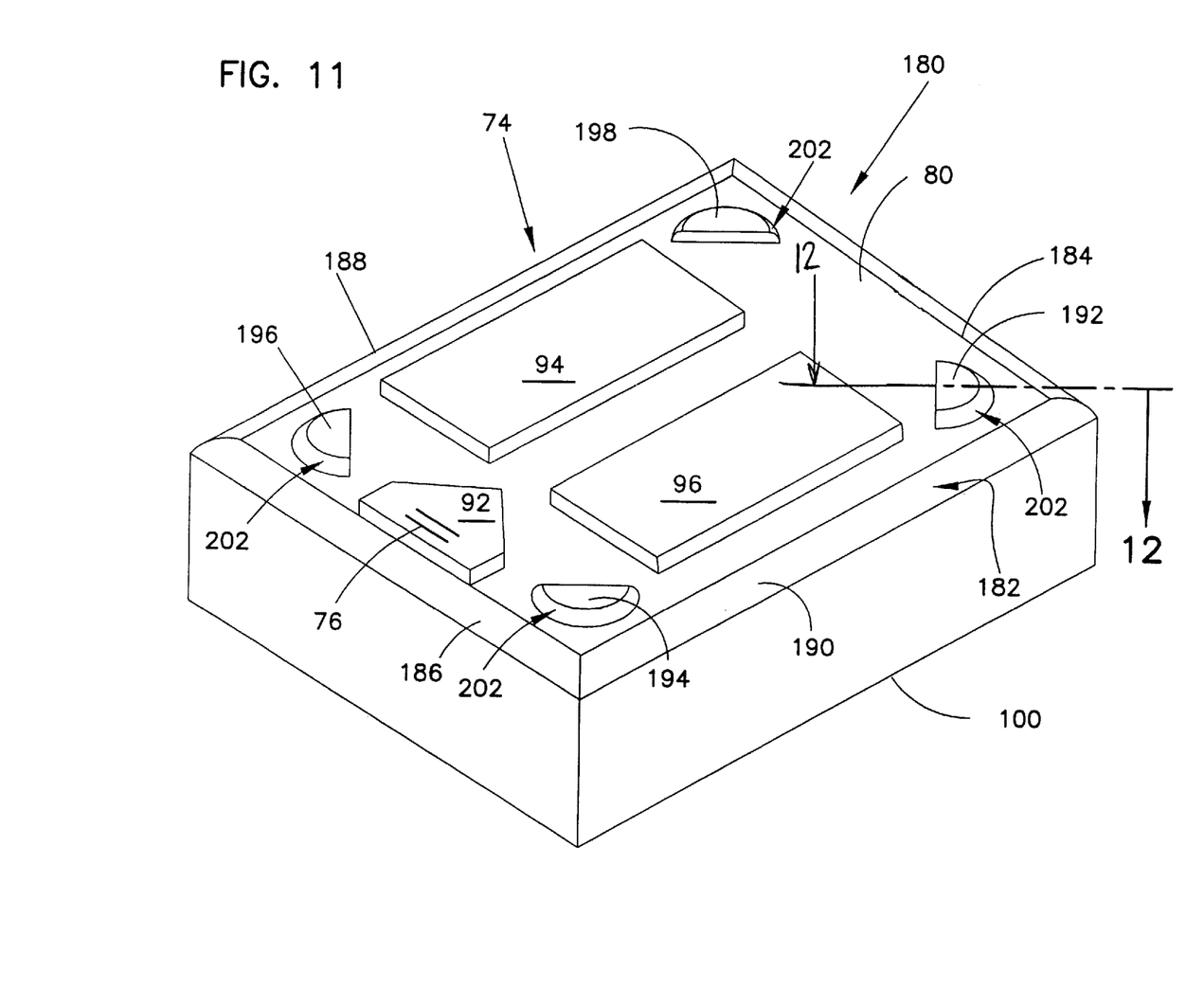
FIG. 11 illustrates an alternate embodiment of a slider incorporating edge protection features.
Figure 12:
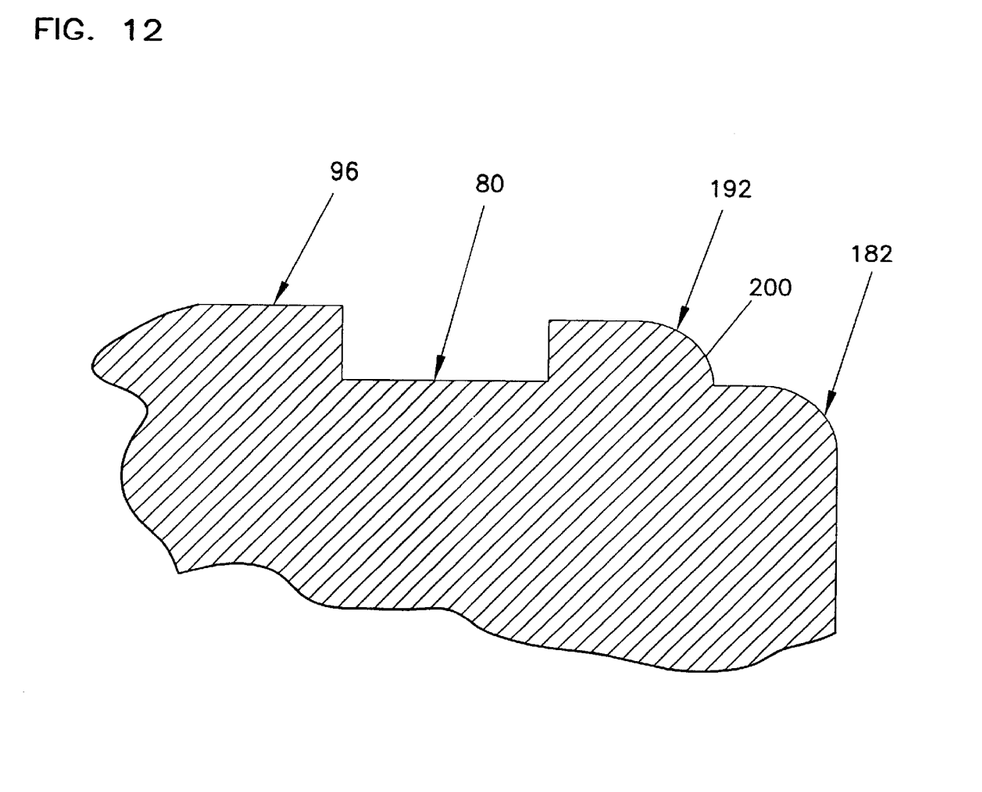
FIG. 12 is a cross-sectional view taken along lines 12—12 of FIG. 11.

Slider 180, shown in FIGS. 11–12, illustrates another embodiment of an edge protection feature. Like numbers in the previous FIGS. are used to identify like parts in slider 180. As shown, slider 180 includes rounded slider body edges 182. Edges are rounded by known rounding or blending processes. Rounded edges distribute contact stress to provide a contact interface between slider body edges and a disc surface. In the embodiment shown, slider includes rounded leading, trailing and side edge portions 184, 186, 188, 190.

As shown, slider body 80 includes raised corner caps 192, 194, 196, 198. Rounded corner caps 192, 194, 196, 198 are located at corners of the slider body 80 and are elevated above the slider body 80 to a height recessed from the air bearing 90 (for example, rails 94, 96), to provide a head disc contact interface without significant affect to fly height characteristics of the air bearing. In the embodiment shown, caps 192, 194, 196, 198 are spaced from perimeter edges of the slider body 80 to provide a contact interface protection for the air bearing 90 (for example rails 94, 96).

Raised outer edges of corner caps 192, 194, 196, 198 include a rounded surface structure 200 as illustrated in FIG. 12. The rounded surface 200 is formed by known blending or grinding techniques for distributing contact stress. In the embodiment illustrated, caps 192, 194, 196, 198 have a curved outward face 202 (as shown in FIG. 11) extending in alignment with traverse edge portions of the slider body 80. The curved face 202 provides contact stress distribution for head-disc contact. In the particular embodiment shown, caps 192, 194, 196, 198 are semicircular shaped but application is not limited to the specific shape shown. Corner caps 192, 194, 196, 198 can be fabricated via material removal during air bearing mask or fabrication or can be formed subsequent to formation of the air bearing 90 via known deposition processes. Outer protective or tribological layers, such as diamond-like carbon, can be added to the rounded surfaces 200 of the corner caps 192, 194, 196, 198 as previously illustrated in FIG. 8.

Thus as described, the present invention relates to a slider 120 including a slider body 80 having an air bearing 90 elevated above the slider body 80 and an elevated rim cap 122. The rim cap includes a rounded interface surface for head-disc impact protection. Slider 180 includes rounded perimeter edges 184, 186, 188, 190 and raised corner caps 192, 194, 196, 198 for head disc contact.

Although a particular bearing surface is shown, it should be understood that alternate bearing designs may be used and application is not limited to a particular bearing design. It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a magnetic disc drive system, it will be appreciated by those skilled in the art that the teachings of the present invention can be applied to other systems, like an optical disc system, without departing from the scope and spirit of the present invention.

What is claimed is:

1. A slider comprising:
   a slider body including a leading edge, a trailing edge and opposed side edges, and the slider body including at least one raised bearing surface and at least one recessed bearing surface, the at least one raised bearing surface extending along elongated raised bearing rails elevated above the at least one recessed bearing surface and the raised bearing rails including raised perimeter edges including raised edge portions offset from the leading, trailing or side edges of the slider body; and
   an elevated leading edge cap, an elevated trailing edge cap and elevated opposed side edge caps along leading, trailing and opposed side edge surfaces of the slider body, the leading, trailing and opposed side edge caps elevated above the at least one recessed bearing surface to form a stepped interface between the elevated leading, trailing and opposed side edge caps and the at least one recessed bearing surface and the leading, trailing or side edge caps including elevated cap portions interposed between the offset raised edge portions of the raised perimeter edges of the elongated bearing rails and the leading, trailing or side edges of the slider body and each of the leading, trailing and opposed side edge caps having a rounded interface surface along a length thereof for head-disc impact protection to protect the edges of the slider body and the raised perimeter edges of the raised bearing rails.

2. The slider of claim 1 wherein the rounded interface surfaces of the leading, trailing and side edge caps extend from a base of the edge cap to an upper surface of the edge cap.

3. The slider of claim 1 wherein the elevated edge caps are formed via a masking process.

4. The slider of claim 1 wherein the rounded interface surfaces of the edge caps are formed via a mechanical, ion milling or chemical rounding process.

5. The slider of claim 1 wherein a portion of at least one of the leading, trailing or opposed side edge caps is formed integral with one of the elongated bearing rails.

6. The slider of claim 1 wherein the slider is coupled to an E-block and assembled in a disc drive.

7. The slider of claim 1 wherein the leading, trailing and opposed side edge caps extend along an entire length of the leading, trailing and side edges of the slider body.

8. The slider of claim 1 wherein the rounded interface surfaces of the leading, trailing and side edge caps includes an outer layer of diamond-like carbon.

9. The slider of claim 1 wherein the elevated leading edge cap, trailing edge cap and opposed side edge caps extend along an entire edge length of the leading, trailing and side edges of the slider body.

10. The slider of claim 1 wherein an elevation height of the leading, trailing and side edge caps is recessed from an elevation height of the at least one raised bearing surface extending along the elongated bearing rails.

11. A slider comprising:
    a slider body including at least one raised bearing surface and at least one recessed bearing surface;
    the slider body including rounded edges to provide impact protection for the slider body and the at least one raised bearing surface including non-rounded edges; and
    at least one raised corner cap having a height extent extending from the at least one recessed bearing surface and an elevated cap surface and the at least one raised corner cap being spaced from at least one of the rounded edges of the slider body and including a rounded interface edge between the height extent and the elevated cap surface to provide impact protection for the non-rounded edges of the at least one raised bearing surface.

12. The slider of claim 11 including at least four corner caps.

13. The slider of claim 11 wherein the rounded interface edge of the at least one raised corner cap extends from a base of the at least one raised corner cap along the height extent of the at least one raised corner cap to the elevated cap surface.

14. The slider of claim 11 wherein the at least one corner cap includes a curved outward face.

15. The slider of claim 11 wherein the at least one raised corner cap is semi-circular shaped.

16. The slider of claim 11 wherein the slider body includes leading, trailing and side edges and the rounded edges of the slider body extend along the leading, trailing and side edges of the slider body.

17. The slider of claim 11 wherein the slider is coupled to an E-block and assembled in a disc drive.

18. The slider of claim 11 wherein the rounded edges of the slider body are formed by a chemical, mechanical or ion milling rounding process.

19. The slider of claim 11 wherein the at least one raised corner cap includes an outer layer of diamond-like carbon.

20. The slider of claim 11 wherein the slider body includes leading, trailing and side edges and the leading, trailing and side edges include rounded edges along an entire edge length of the leading, trailing and side edges of the slider body.

21. A slider comprising:
    a slider body having a leading edge, a trailing edge and side edges and including at least one raised bearing surface and at least one recessed bearing surface; and
    dual edge protection means for providing contact interface protection for the leading, trailing and side edges of the slider body and edges of the at least one raised bearing surface.

22. The slider of claim 21 wherein the dual edge protection means includes;
   rounded edges extending about a perimeter of the slider body to provide impact protection for the slider body; and
   raised corner caps on the slider body spaced from the edges of the slider body and elevated above the at least one recessed bearing surface and including a rounded interface surface to provide impact protection for the at least one raised bearing surface.

23. The slider of claim 21 wherein the dual edge protection means includes an elevated edge cap extending about a perimeter of the slider body.

24. A slider comprising:
   a slider body including a leading edge, a trailing edge and opposed side edges and including a raised bearing surface elevated above a recessed bearing surface and the raised bearing surface including at least one raised bearing rail having an elongated length dimension extending between a leading edge and a trailing edge of the raised bearing rail and a width dimension between opposed sides of the raised bearing rail and the leading and trailing edges of the raised bearing rail being aligned between the leading and trailing edge of the slider body and the raised bearing rail including a raised edge portion offset from one of the leading, trailing or side edges of the slider body; and
   an elongated edge cap elevated above the recessed bearing surface to form a stepped interface between the elevated edge cap and the recessed bearing surface and the edge cap including an elevated portion being interposed between the raised offset edge portion of the raised bearing rail and the leading, trailing or side edges of the slider body and the edge cap including a rounded interface surface along a length of the edge cap.

25. A slider comprising:
   a slider body including a leading edge, a trailing edge and opposed side edges and including an elevated raised bearing rail forming a raised bearing surface elevated above a recessed bearing surface and the raised bearing rail including an elongated length dimension extending between a leading edge and a trailing edge of the raised bearing rail and a width dimension between opposed sides of the raised bearing rail and the leading and trailing edges of the raised bearing rail being aligned between the leading and trailing edges of the slider body; and
   an edge cap elevated above the recessed bearing surface and having a height elevation recessed from the elevated raised bearing rail and the edge cap including a height extent and an elevated edge cap surface and the edge cap including a rounded interface surface between the height extent and the elevated edge cap surface along a length thereof.

* * * * *